W. J. HOLMES.
SAW FILING MACHINE.
APPLICATION FILED NOV. 25, 1912.

1,087,373.

Patented Feb. 17, 1914.

4 SHEETS—SHEET 1.

WITNESSES.
INVENTOR
W. J. Holmes

W. J. HOLMES.
SAW FILING MACHINE.
APPLICATION FILED NOV. 25, 1912.

1,087,373.

Patented Feb. 17, 1914.
4 SHEETS—SHEET 2.

WITNESSES.

INVENTOR.

W. J. HOLMES.
SAW FILING MACHINE.
APPLICATION FILED NOV. 25, 1912.

1,087,373.

Patented Feb. 17, 1914.

4 SHEETS—SHEET 3.

WITNESSES.

INVENTOR

W. J. HOLMES.
SAW FILING MACHINE.
APPLICATION FILED NOV. 25, 1912.
1,087,373.
Patented Feb. 17, 1914.
4 SHEETS—SHEET 4.
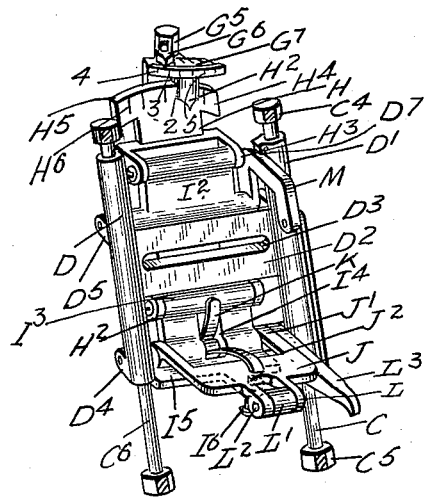
FIG. 8.
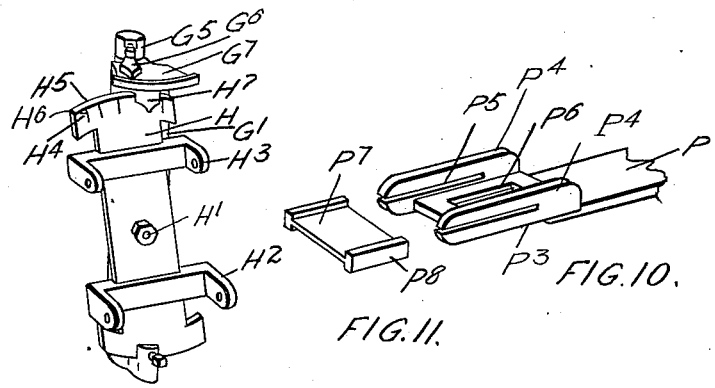
FIG. 11.   FIG. 10.
FIG. 9.
FIG. 13.
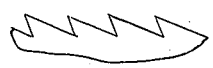
FIG. 12.
FIG. 14.
FIG. 15.
WITNESSES.
INVENTOR.
W. J. Holmes

UNITED STATES PATENT OFFICE.

WILLIAM JOHN HOLMES, OF TORONTO, ONTARIO, CANADA.

SAW-FILING MACHINE.

1,087,373.   Specification of Letters Patent.   Patented Feb. 17, 1914.

Application filed November 25, 1912. Serial No. 733,315.

*To all whom it may concern:*

Be it known that I, WILLIAM JOHN HOLMES, of the city of Toronto, in the county of York, in the Province of Ontario, Canada, have invented certain new and useful Improvements in Saw-Filing Machines, of which the following is the specification.

My invention relates to improvements in saw filing machines, and the object of the invention is to provide a machine which will automatically sharpen various sizes and styles of saw teeth and whereby the saw is fed automatically by the action of the file and it consists essentially of a file holder, means for adjusting the angular set of the file both in a horizontal and vertical direction, a saw holder for slidably holding the saw, means for reciprocating the file vertically and carrying it bodily in an angular direction to feed the saw, means for carrying the file to and from the saw at the completion of its up and down stroke, and means for regulating the pressure of the file upon the saw during its down stroke as hereinafter more particularly explained.

Figure 1:
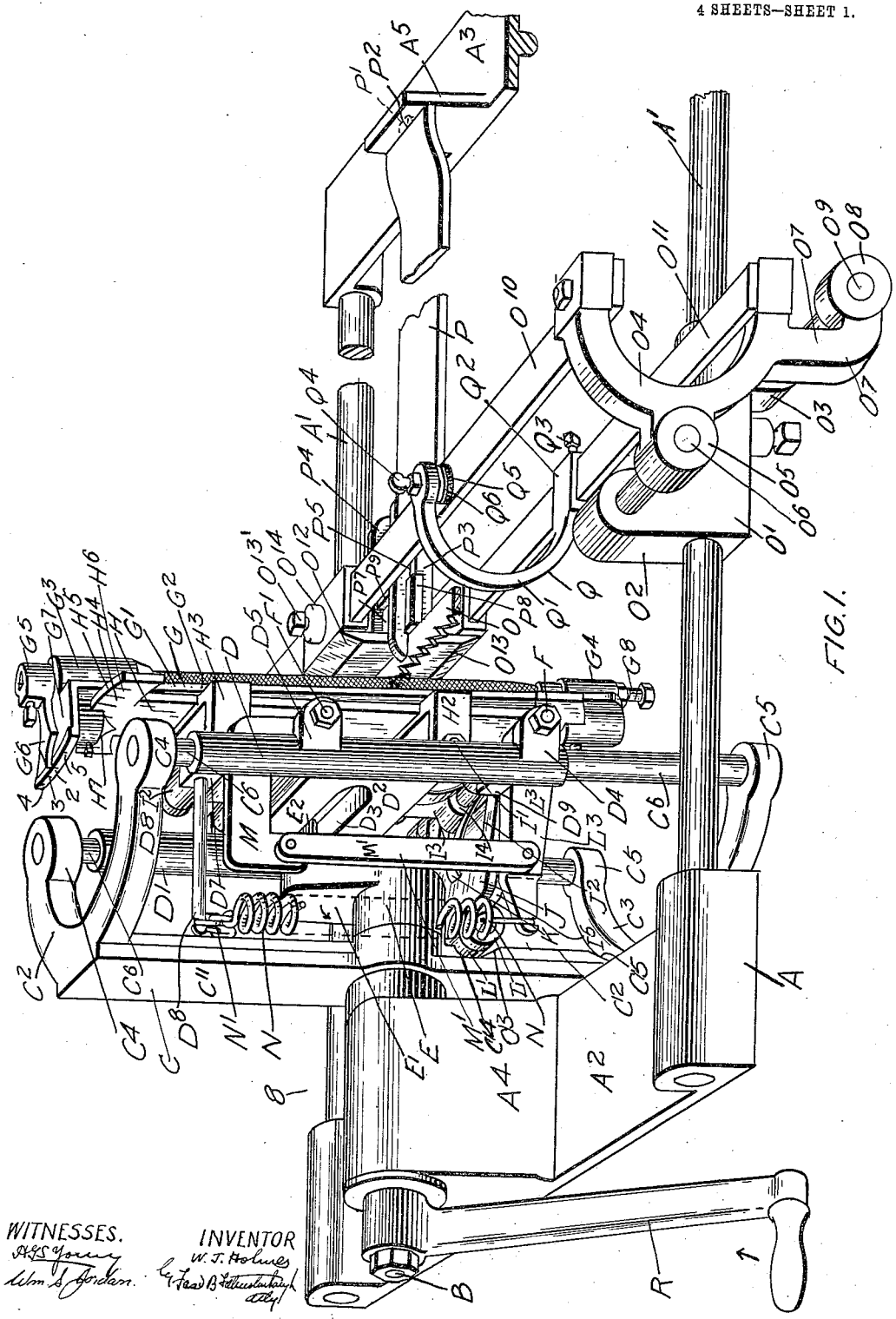
Figure 2:
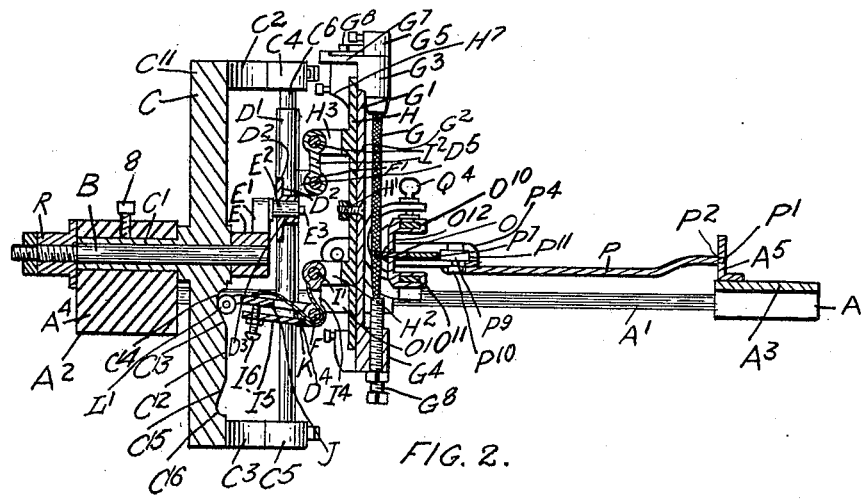
Figure 3:
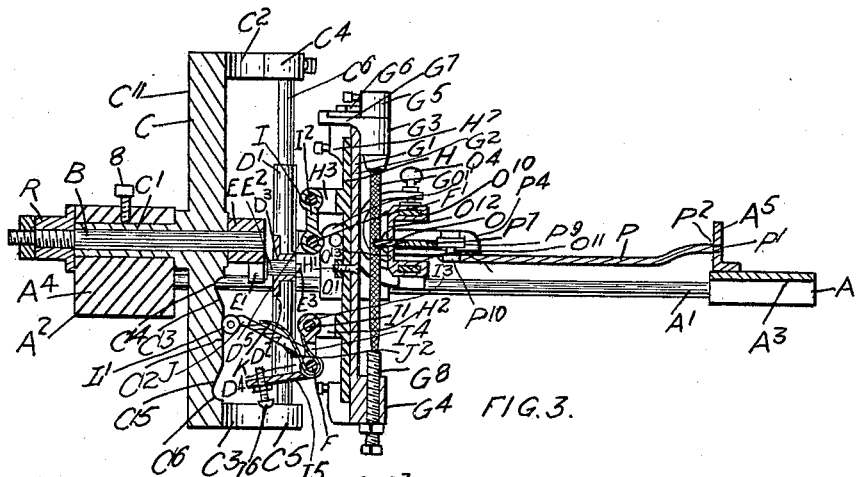
Figure 4:
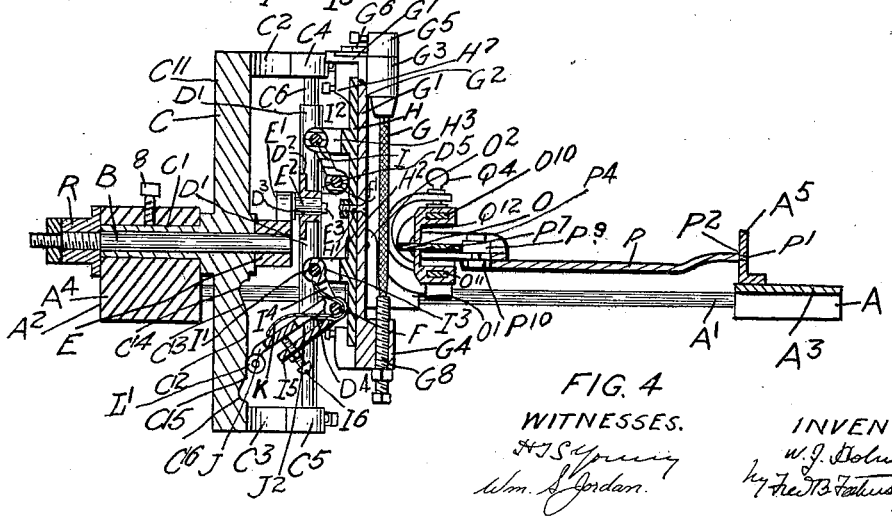
Figure 5:
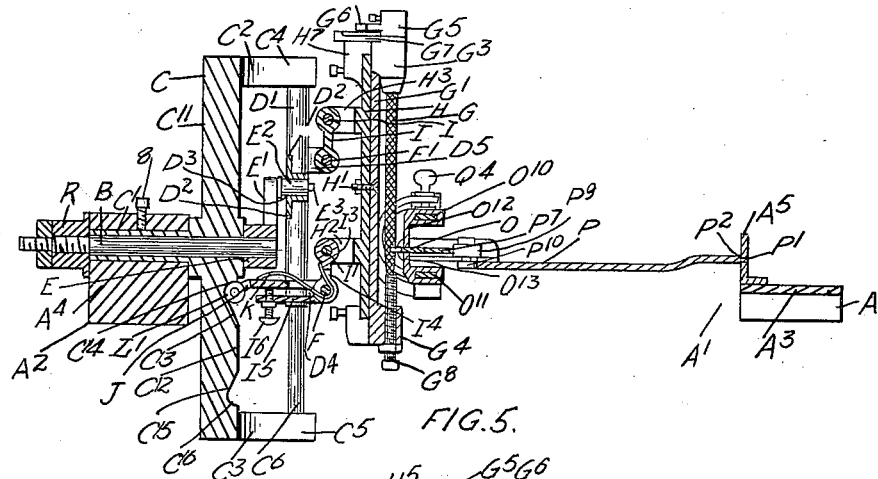
Figure 6:
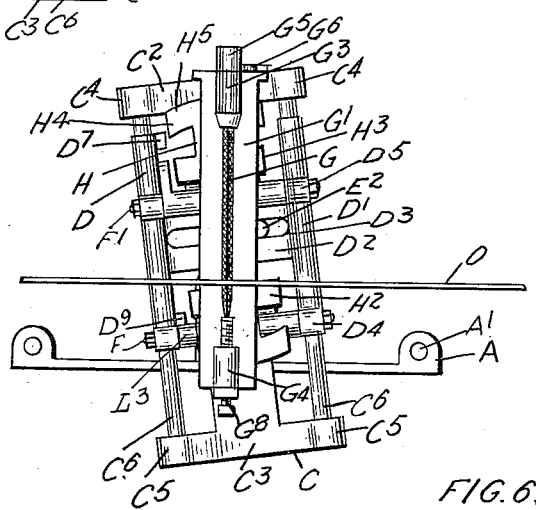
Figure 7:
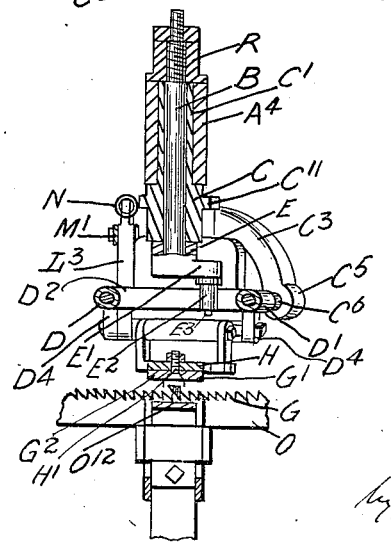

Figure 1, is a general perspective view of my device. Fig. 2, is a longitudinal sectional view on a smaller scale to Fig. 1, showing the position of the file at the commencement of the down stroke. Fig. 3, is a similar view to Fig. 2 showing the position of the file and co-acting parts during its down stroke. Fig. 4, is a similar view to Figs. 2 and 3 showing the position of the file and co-acting parts at the commencement of the up stroke of the file. Fig. 5, is a similar view to Figs. 2, 3, and 4 showing the position of the file and co-acting parts ready to enter between the teeth of the saw before the commencement of the down stroke. Fig. 6, is a view of the file holder and supporting parts in elevation. Fig. 7, is a sectional plan through the file and co-acting parts. Fig. 8, is a perspective detail of the file holder and supporting parts. Fig. 9, is a perspective detail of the file holder. Figs. 10 and 11 are perspective details of the parts forming the saw holder. Fig. 12, is a detail showing an undercut tooth. Fig. 13, is a detail showing a straight face tooth. Fig. 14 is a detail showing a wedged tooth. Fig. 15, is a detail of the regular cross cut tooth.

In the drawings like letters of reference indicate corresponding parts in each figure.

A is the main frame comprising the side bars $A'$, and the end bars $A^2$ and $A^3$.

$A^4$ is a standard extending upwardly from the end bar $A^2$ and $A^5$ is a lug extending upwardly from the end bar $A^3$.

B is the operating shaft.

C is a cradle provided with a hollow boss $C'$ forming a sleeve journaled in the bearing $A^4$ and surrounding the operating shaft B. The cradle C comprises a normally vertical portion $C^{11}$ and upper and lower semi-circular arms $C^2$ and $C^3$ respectively terminating in bearings $C^4$ and $C^5$.

$C^6$ are rods journaled at their upper ends in the bearing $C^4$ and at their lower ends in the bearing $C^5$.

D and $D'$ are sleeves slidably held upon the rods $C^6$. The sleeves D and $D'$ are connected together intermediately of their height by the cross web $D^2$ provided with a slot $D^3$. The sleeves D and $D'$ are also provided with inwardly extending lugs $D^4$ at their lower ends and lugs $D^5$ intermediately of their height.

$D^7$ is a boss extending inwardly from the sleeve D toward the longitudinal center of the machine.

$D^8$ is a rod extending outwardly from the boss $D^7$ toward the end of the machine and having a notch at its outer end.

$D^9$ is a boss similar to the boss $D^7$ extending from the sleeve D in proximity to the lower end thereof.

The vertical portion $C^{11}$ of the cradle is provided with a vertical rib $C^{12}$ having an inclined portion $C^{13}$ terminating in recesses $C^{14}$ located slightly below the center of the cradle and an inclined portion $C^{15}$ in proximity to the lower end of the portion $C^{11}$ and terminating in a recess $C^{16}$.

E is a collar secured on the shaft B.

$E'$ is a crank arm extending from the collar E.

$E^2$ is a roller journaled on a pin $E^3$ and extending from the arm $E'$. The roller $E^2$ extends into the slot $D^3$ formed in the web $D^2$.

F is a cross rod secured in the lugs D$^4$.

F' is a cross rod secured in the lugs D$^5$.

G is a file.

G' is the file support comprising a plate G$^2$ provided with a vertical bearing boss G$^3$ at its upper end and an internally threaded vertical boss G$^4$ at its lower end. The file G is turnably held at its upper end within the boss G$^3$.

G$^5$ is a collar secured to the upper end of the file.

G$^6$ is a pointer extending from the collar G$^5$.

G$^7$ is an arc-shaped indicating flange suitably divided to indicate the position to which the file is turned horizontally.

G$^8$ is a bearing screw threaded into the boss G$^4$ provided with a recessed upper end into which the lower end of the point of the file fits.

H is the file holder to which the file support G' is connected by a screw bolt H'. The plate G$^2$ forming the file support swings the screw bolt H'.

H$^2$ are lugs extending from each side of the base plate H in proximity to the lower end thereof.

H$^3$ are lugs extending from each side of the base plate in proximity to the upper end thereof.

H$^4$ is an enlargement of the base plate having an arc-shaped outer end H$^5$ formed concentric to the screw H'. The outer surface of the enlargement H$^4$ is provided with suitable indicating lines H$^6$.

H$^7$ is a pointer extending from and forming part of the plate G$^2$, such pointer coacting with the indicating lines H$^6$ to indicate the position to which the file is to be swung vertically.

I is a rod secured at its ends in the lugs H$^3$.

I' is a rod secured at its ends in the lugs H$^2$.

I$^2$ is a link swung at its upper end on the rod I and at its lower end on the rod F'.

I$^3$ is a link swung at its upper end on the rod I' and at its lower end on the rod F. The link I$^3$ is provided with a center opening I$^4$.

I$^5$ is a flange like extension projecting from the lower end of the link I$^3$ substantially at right angles to the body of the link I$^3$.

I$^6$ is a set screw threaded into the portion I$^5$.

J is a plate having bearings J' swung on the rod F.

K is a leaf spring extending around the rod F and at one end upwardly through the opening I$^4$ so as to bear against the opposite side of the link I$^3$ at the top. The opposite end of the spring extends through an opening J$^2$ in the plate J so as to bear upon the top of the plate.

L are lugs extending from the plate J and L' is a roller journaled between the lugs on a pin L$^2$.

L$^3$ is an arm forming part of the plate I$^5$.

M is an arm forming part of the link I$^2$.

M' is a link pivotally connected at its upper end to the depending end of the arm M and at its lower end to the arm L$^3$.

N is a tension spring connected at its lower end to the arm L$^3$ and N' is a chain connected to the upper end of the spring N and through one of the links of which the notched end of the bar D$^8$ extends. By withdrawing the notched end of the bar from any one of the links of the chain N' and inserting it in another link I am enabled to vary the tension of the spring upon the arm L$^3$ and consequently upon the arm M carrying the upper ends of the links I$^2$ and I$^3$ away from the cradle C.

O is a saw of any suitable form.

O' are adjustable bearings secured upon the side bars A' of the main frame.

O$^2$ is a standard extending upwardly from the bearing O' and O$^3$ is a hanger depending from the sleeve O'.

O$^4$ is a bracket provided with a bearing portion O$^5$ in which is secured a stud O$^6$ slidably held at its opposite end upon the standard O$^2$.

O$^7$ is a depending extension of the bracket O$^4$ provided with a bearing portion O$^8$ and in which is secured a stud O$^9$ extending at its opposite end slidably through the hanger O$^3$.

O$^{10}$ is a bar extending from the top of the bracket O$^4$ at one side of the machine to the top of the bracket O$^4$ at the opposite side of the machine. O$^{11}$ is a similar bar connecting the lower end of the brackets O$^4$ together.

O$^{12}$ and O$^{13}$ are adjustable gripping fingers extending against the upper and lower faces of the saw O in proximity to the back edge thereof.

P is a bar provided at one end with a projection P' extending into a slot P$^2$ formed in the lug A$^5$. The opposite end of the bar P is provided with an enlargement P$^3$ and side flanges P$^4$ provided with horizontal open ended slots P$^5$ between which the gripping fingers O$^{12}$ and O$^{13}$ extend and the stops of which receive at their open ends the back edge of the saw. The enlargement P$^3$ is provided with a longitudinal slot P$^6$.

P$^7$ is a metal plate fitting into the slots P$^5$ against the back of the saw. The plate P$^7$ is preferably provided with enlarged ends P$^8$ designed to prevent the cross movement of the plate within the slots P$^5$.

P$^9$ is a block adjustably secured by the bolt P$^{10}$ against the edge of the plate P$^7$ opposite to the edge against which the back of the saw bears.

The gripping fingers O$^{12}$ and O$^{13}$ are provided with collars $O^{14}$ adjustably secured to the bars $O^{10}$ and $O^{11}$ by the set screw $O^{13'}$.

Q is a tension device comprising an arm $Q'$ connected to the bar $O^{11}$ by the collar $Q^2$ adjustably secured in position on the bar $O^{11}$ by the set screw $Q^3$. $Q^4$ is a set screw extending through the upper end of the arm $Q'$ and $Q^5$ is a rubber washer having a metal top $Q^6$ against which the set screw $Q^4$ bears. It will, of course, be understood that there is one of these tension devices Q at each side of the gripping fingers $O^{12}$ and $O^{13}$. By adjusting the set screw $Q^4$ the pressure of the fingers $O^{12}$ and $O^{13}$ may be varied regulating the freedom with which the saw is fed between the gripping fingers $O^{12}$ and $O^{13}$.

R is an operating crank secured to the outer end of the operating shaft B.

Having described the principal parts involved in my invention I will briefly describe its operation.

By rotating the crank in the direction indicated by arrow the main shaft is rotated and the arm $E'$ turned in the direction of arrow (see Fig. 7). The arm $E'$ carries the roller $E^2$ in a downward direction thereby carrying the cross web $D^2$ and sleeves D and $D'$ slidably supported upon the rods $C^6$ downwardly, this movement being indicated by the position of the parts shown in Fig. 2. During the initial operation the file engages the saw by the pressure of the spring K which forces the upper end of the link $I^3$ and consequently the plates H and $G^2$ and the file carried thereby into the space between the saw teeth. When the file is brought against the base of the teeth the tendency of the saw is to hold the file in such a position toward the cradle C that the links $I^3$ and $I^2$ are swung at the top toward the cradle. By this means the arms M and $L^3$ are held downwardly thereby forcing the spring N into tension, the force of the spring being regulated as hereinbefore described by means of the chain $N'$ engaging the notched end of the arm $D^8$. The tension of the spring N and the compression of the spring K serve to force the file toward the base of the tooth until the arm M strikes the boss $D^7$, the cutting power of the file being controlled by the greater or less tension of the spring N.

As the roller $L'$ travels along the vertical portion $C^{12}$ as shown in Fig. 3 the file makes its cut. At the end of the stroke of the file the roller $L'$ reaches the inclined portion $C^{15}$ and the notch $C^{16}$ into which it drops carried by gravity and the force of the spring K. As the roller $E^2$ passes beneath the center of the shaft B the direction of the stroke of the file is reversed. Simultaneously upon the reversal of the stroke of the file the roller $L'$ engages the inclined portion $C^{15}$ swinging the plate J downwardly on the rod F against the upper end of the set screw $I^6$ thereby forcing the extension $I^5$ of the link $I^3$ downwardly carrying the upper end of the link $I^3$ outwardly toward the cradle. Simultaneously the link I is swung outwardly at its upper end by means of the arm $L^3$, forming part of the link $I^3$, connected to the arm M by the link $M'$. This outward movement of the upper end of the links $I^3$ and $I^2$ carries the plates H and $G^2$ outwardly toward the cradle and the file away from the saw and simultaneously further stretching the spring N. The position of the file and co-acting parts at this point of the operation are shown by Fig. 4 of the drawings. The file is then carried upwardly by the roller $E^2$ until the roller $L'$ travels off the vertical portion $C^{12}$ and on to the inclined portion $C^{13}$ and in to the notch $C^{14}$.

The position of the parts when the roller has entered the notch $C^{14}$ at the end of the up stroke of the file is shown by Fig. 5 of the drawings. It will be seen that in this position of the parts that the file is thrown forward toward the saw but has only partially entered the notch between the teeth, being held in this position by the spring N, and is still free of the base of the teeth. Immediately the down stroke commences the plate J is swung from a horizontal position in to the slightly inclined position shown in Fig. 2 thereby compressing the spring K to force the upper end of the link $I^3$ inwardly from the cradle and the file into the base of the teeth.

It will, of course, be understood that the initial movement of the file toward the saw when entering the notch is operated by means of the spring N carrying the file toward the saw with considerable force. If the file under these conditions was carried by the spring N directly to the base of the tooth it would have a tendency either to injure the file or the saw. I, therefore, first carry the file partially into the tooth as above described and as shown in Fig. 5 by means of the heavy spring N and then carry the file to the base of the tooth as shown in Fig. 2 by the compression of the light spring K. The spring K is then compressed to its limit and the spring N serves to hold the file to its work.

The indicating flange $G^7$ is divided by the indicating marks 2, 3, 4, 5 and 6. When the pointer $G^6$ is set to the indicating mark 4, the file is in the position for filing teeth of the form shown in Fig. 12. When the pointer is set to the indicating mark 3 it is in the position to cut the teeth shown in Fig. 13. When the pointer $G^6$ is set to the center or to the indicating mark 2 it is in the position to cut teeth shown in Fig. 14. When the point $G^6$ is set to the indicating mark 5 the file is in the position for cutting the teeth shown in Fig. 15.

It will be understood that rip saw teeth such as shown in Figs. 12 and 13 are filed with the file traveling vertically. Cross cut teeth are formed with the side cut as shown in Figs. 14 and 15. To produce a side cut the plate G' is swung to an angle in relation to the plate H thus placing the file at an inclined position to the saw.

To feed the saw by the action of the file it is necessary to set the cradle C in an inclined position in relation to the position of the saw as shown particularly in Fig. 6 of the drawings. This is accomplished by loosening the set screw 8 and swinging the cradle around in the bearing $A^4$ to the required position, the file, of course, being returned in its normal position to the saw, that is, to either cut vertically or at an inclined direction to the saw.

It will be understood that the distance of the lateral travel of the file as it travels from the top to the bottom of its stroke must be equal to the width of the tooth, that is, from the base of one tooth to the base of the next tooth. If the tooth is a wide tooth the angle to which the cradle is set will be greater than if a narrow tooth were being filed.

It will thus be seen that as the file travels downwardly to sharpen the tooth as above described it will bear against the short face of the tooth and as the file is carried bodily laterally, the file moving down the inclined bars $C^6$ of the cradle, the saw is carried by the file a space of one tooth and as the file is withdrawn at the end of its down stroke the saw is moved to such a position that the base of the next adjacent tooth will be opposite the center of the lower end of the file so that at the end of the up stroke the center of the file will be opposite the base of the next adjacent tooth ready to engage the same.

Of course when cutting cross cut teeth as shown in Figs. 14 and 15 the cradle has to be set at a greater incline in the same direction than the file is inclined so that the direction of feed of the saw is in the same direction as the inclined cut is made. In other words the direction in which the file is feeding the saw is away from the base against which the file is cutting. The boss $D^3$ holds the file in a positive position when it is withdrawn from the saw and prevents the file jamming in the saw at the commencement of its stroke.

From this description it will be seen that I have devised a very simple form of saw filing machine which may be adjusted to cut various sizes and styles of teeth and in which the saw is fed automatically by the cutting movement of the file.

What I claim as my invention is:

1. In a saw filing machine, the combination with the saw holder in which the saw is held to slide longitudinally, of a file and means for reciprocating the file against the saw teeth, and means for feeding the saw slidably through the holder operated by the movement of the file against the teeth, as and for the purpose specified.

2. In a saw filing machine, the combination with the saw holder in which the saw is slidably held, of a file holder and file, a slide way supporting the file holder, means for adjusting the angle of the slide way in a vertical plane, and means for reciprocating the file on the slideway whereby the file is carried bodily laterally against the saw tooth, as and for the purpose specified.

3. In a saw filing machine, the combination with the saw holder in which the saw is slidably held, of a slideway, means for adjustably securing the slideway in different angular positions, a file holder, a file support carried by the file holder, and means for adjusting the angular set of the file support in relation to the file holder, as and for the purpose specified.

4. In a saw filing machine, the combination with the main frame having a bearing at one end thereof, of an operating shaft journaled in the bearing, a cradle supported upon the operating shaft, means for adjustably securing the cradle in different angular positions, slide bars forming part of the cradle, sleeves carried by the slide bars, connecting sleeves having a cross slot therein, an operating crank at the end of the operating shaft, a roller journaled upon the crank and extending into the slot, a file holder carried by the sleeves, a saw holder in which the saw is slidably held, and means for automatically carrying the file into contact with the base of the teeth at the commencement of the down stroke and away from the base of the teeth at the commencement of the up stroke, as and for the purpose specified.

5. In a saw filing machine, the combination with the main frame having a bearing at one end, of an operating shaft journaled in the bearing, a cradle swung upon the operating shaft, means for adjustably securing the cradle in different angular positions, slide bars forming part of the cradle, connected sleeves carried by the slide bars, means for reciprocating the sleeves operated by the main shaft, a file holder, a pair of links pivotally connected at their lower ends to the sleeves and at their upper ends to the file holder, a saw holder in which the saw is slidably held, means for automatically swinging the links outwardly at their upper end to carry the file holder toward the saw at the commencement of the down stroke of the file and for swinging the links inwardly at the end of the down stroke of the file to carry the file holder away from the saw, as and for the purpose specified.

6. In a saw filing machine, the combination with the main frame having a bearing at one end and a saw holder in which the saw is slidably held, of an operating shaft journaled in the bearing, a cradle swung upon the operating shaft, means for adjustably securing the cradle in different angular positions, slide bars carried by the cradle, connected sleeves carried by the slide bars, a file holder, a pair of links connected at their lower ends and at their upper ends to the file holder, means for forcing the upper ends of the link and the file holder and file away from the saw at the commencement of the upstroke of the file, means for releasing such forcing means at the end of the up stroke and spring tension means for carrying the file toward the saw when such forcing means is released and at the end of the up stroke of the file, and means for reciprocating the file, as and for the purpose specified.

7. In a saw filing machine, the combination with the main frame having a bearing at one end, of a saw holder carried by the main frame, of an operating shaft journaled in the bearing, a cradle carried by the operating shaft, means for adjustably securing the cradle in different angular positions, slide bars carried by the cradle, connected sleeves carried by the slide bars, a file holder and file, a pair of links connected at their lower ends to the file holder, means for reciprocating the file and file holder, means for forcing the upper ends of the links and the file and file holder away from the saw at the commencement of the up stroke, and for releasing such forcing means at the end of the up stroke, spring tension means for carrying the file partially into the space between the teeth when such forcing means is released, and supplemental means for carrying the file completely into the space and against the base of the teeth at the commencement of the down stroke of the file, as and for the purpose specified.

8. In a saw filing machine, the combination with the main frame having a bearing at one end, of a saw holder carried by the main frame, of an operating shaft journaled in the bearing, a cradle carried by the operating shaft, means for adjustably securing the cradle in different angular positions, slide bars carried by the cradle, connected sleeves carried by the slide bars, a file holder and file, a pair of links connected at their lower ends to the file holder, means for reciprocating the file and file holder, means for forcing the upper ends of the links and the file and file holder away from the saw at the commencement of the up stroke, and for releasing such forcing means at the end of the up stroke, spring tension means for carrying the file into the space between the teeth when such forcing means is released, and means for regulating such tension, as and for the purpose specified.

9. In a saw filing machine, the combination with the main frame having a bearing at one end, of a saw holder carried by the main frame, of an operating shaft journaled in the bearing, a cradle carried by the operating shaft, means for adjustably securing the cradle in different angular positions, slide bars carried by the cradle, connected sleeves carried by the slide bars, a file holder and file, a pair of links connected at their lower ends to the file holder, means for reciprocating the file and file holder, means for forcing the upper ends of the links and the file and file holder away from the saw at the commencement of the upstroke, and for releasing such forcing means at the end of the up stroke, spring tension means for carrying the file partially into the space between the teeth when such forcing means is released, means for regulating the distance the file is carried into the space between the teeth by the spring tension, and supplemental means for carrying the file completely into the space and against the base of the teeth at the commencement of the down stroke of the file, as and for the purpose specified.

10. In a saw filing machine, the combination with the main frame having a bearing at one end of the main frame, and a saw holder, of an operating shaft journaled in the bearing, a cradle swung upon the operating shaft and having a longitudinal rib section terminating in inclined portions terminating in recesses and slide bars carried by the cradle, a file holder and file, connected sleeves carried by the slide bars, links pivotally connected at their lower ends to the sleeves and at their upper ends to the file holder, a right angular extension to one of the links, a supplemental swing plate swung upon the bearing of the link having a right angular extension, a roller journaled in the free end of such plate and co-acting with the rib section, a set screw extending through the right angular extension against the lower face of such plate, means for holding the plate against the end of the screw and spring tension means for carrying the file toward the saw upon the roller entering the recess at the upper end of the rib section, as and for the purpose specified.

11. In a saw filing machine, the combination with the main frame having a bearing at one end of the main frame, and a saw holder, of an operating shaft journaled in the bearing, a cradle swung upon the operating shaft and having a longitudinal rib section terminating in inclined portions terminating in recesses and slide bars carried by the cradle, a file holder and file, connected sleeves carried by the slide bars, links pivotally connected at their lower ends to the sleeve and at their upper ends to the file holder, a right angular extension to one of the links, a supplemental swing plate swung upon the bearing of the link having a right angular extension, a roller journaled in the free end of such plate and co-acting with the rib section, a set screw extending through the right angular extension against the lower face of such plate, means for holding the plate against the end of the screw, an arm extending from each link, a link connecting the free ends of the arms and a tension spring connecting the end of one arm to a suitable support, as and for the purpose specified.

12. In a saw filing machine, the combination with the file holder comprising a vertical plate terminating in arc-shaped enlargements concentric with the center of the plate, of a file holder comprising a plate swingably supported upon the center of the plate of the file holder, bearings at the upper and lower end of the plate forming a file support and in which the file is held, and means for adjustably securing the file supporting plate in different angular positions in relation to the file holding plate, as and for the purpose specified.

WILLIAM JOHN HOLMES.

Witnesses:
M. EGAN,
N. HAYES.

---

Copies of this patent may be obtained for five cents each, by addressing the "Commissioner of Patents, Washington, D. C."